United States Patent [19]

Tomisawa et al.

[11] 4,339,813
[45] Jul. 13, 1982

[54] APPARATUS FOR DETECTING GROOVE END OF RECORD DISK

[75] Inventors: Norio Tomisawa; Atsushi Takeuchi; Nobuyuki Tamori, all of Hamamatsu, Japan

[73] Assignee: Nippon Gakki Seizo Kabushiki Kaisha, Hamamatsu, Japan

[21] Appl. No.: 183,994

[22] Filed: Sep. 4, 1980

[30] Foreign Application Priority Data

Sep. 5, 1979 [JP] Japan .................................. 54-113760

[51] Int. Cl.³ ............................................ G11B 17/00
[52] U.S. Cl. ...................................................... 369/231
[58] Field of Search ................ 369/33, 215, 220, 221, 369/226, 231, 232, 233

[56] References Cited

U.S. PATENT DOCUMENTS 3,599,984 8/1971 Kondo .................................. 369/226
3,701,534 10/1972 Lane .................................... 369/226

FOREIGN PATENT DOCUMENTS 48-16362 5/1973 Japan .
1182294 2/1970 United Kingdom ................ 369/231

*Primary Examiner*—John W. Shepperd
*Attorney, Agent, or Firm*—Cushman, Darby & Cushman

[57] ABSTRACT

A groove-end detecting apparatus of a record disk or video disk, arranged to have a pulse generator for generating a pulse of a short period when the movement speed of the pickup arm is great, and having a long period when this movement speed is low, i.e. a pulse having a period inversely proportional to the movement speed of the pickup arm. This pulse is provided as a set pulse to a counter circuit assigned for counting a certain frequency clock pulse so as to generate a groove-end detection signal when the cycle is within the time which is required for the counting of a predetermined value of the count of the clock pulse.

17 Claims, 7 Drawing Figures

(A) CLOCK PULSE (B) OUTPUT OF AN INVERTER 14

(C) OUTPUT OF A D-FF 28

(D) OUTPUT OF AN INVERTER 29

(E) OUTPUT OF AN AND GATE 30

APPARATUS FOR DETECTING GROOVE END OF RECORD DISK

BACKGROUND OF THE INVENTION (a) Field of the Invention

The present invention relates to an apparatus for detecting the end of a signal-carrying groove of a record or video disk in a phonographic record player or the like.

(b) Description of the Prior Art

In the past, the detection of the end of a signal-carrying groove on a record disk has usually been performed by the detection of the difference in pitch between the signal-carrying groove and the lead-out groove. Devices are known for either mechanically or electrically detecting the difference in pitch of a record disk. In the mechanical device, the pickup arm, as it travels progressively toward the center of the record disk, progressively urges a lever of a means for detecting the groove pitch, i.e. the interval between the adjacently located portions of the record groove. When the pitch of traveling pickup arm exceeds a predetermined value for each one whole revolution of the turntable, the arm-returning mechanism is actuated. However, the pickup arm is subjected to a lateral pressure toward the outer peripheral direction of the record disk, so that the reproduced signal is distorted, causing the reproduced sound to become indistinct. In an extreme case, the stylus tip could jump out of the groove. Such jumping of the stylus tip is especially prominent when using a cartridge operable with a light vertical force. Furthermore, the groove-detecting apparatus of this type has a complicated arrangement, so that manufacturing must be precise to ensure proper performance. Thus, the designing and the adjustment of the apparatus are extremely difficult, causing an increase in the cost of manufacture.

As for the apparatus for electrically detecting the difference in groove pitch, there has been proposed an apparatus shown in FIG. 1 (Japanese Patent Publication No. Sho 48-16362). In the apparatus shown in FIG. 1, reference numeral 1 represents a pulse generator for generating pulses having periods inversely proportional to proportion, of the rotation speed of the pickup arm. Though not illustrated, this pulse generator is comprised of a shutter plate provided with a plurality of slits and arranged to rotate in accordance with the horizontal rotation of the pickup arm. Also provided are an optical mechanism including a light-emitting element provided above the shutter plate to face the slits section of this plate and a light-receiving element provided beneath the shutter plate to face said slits section. Finally a transducer converts a signal delivered from the light-receiving element into a binary pulse signal. During periods in which the stylus tip is tracing the record groove, pulses having long periods are outputted because of a small rotation speed of the pickup arm during the tracing period. When the stylus tip traces the end portion of the groove of the disk, pulses having relatively short periods are outputted because, during such time, the rotation speed of the pickup arm increases conspicuously. The output pulses of the pulse generator are counted by a counter circuit 2. This counter circuit 2 is reset periodically by an output of an oscillator 3. When the count of the counter circuit 2 has exceeded a predetermined value related to the period of oscillator 3, i.e., when the stylus tip traces the groove end portion, there is outputted a pickup arm returning signal to a returning mechanism actuating section 4, to thereby cause the pickup arm to return to the arm-rest position. It has been accepted generally that the signal-carrying groove has a pitch of about 0.1 mm, the lead-out groove has a pitch of 4.0~9.0 mm, and the pitch of the lead groove between adjacent two signal-carrying grooves is 1.0 mm which is not sensed by the groove-detecting mechanism.

In this known electrically-detecting apparatus, it is difficult, in view of the structure of the shutter plate, to form a number of slits in this shutter plate, i.e., the number of slits which can be formed is limited. Accordingly, it is not possible to reduce the period of the output pulses of the pulse generator 1 below a certain value. When the period of the output pulses is below a certain level, the precision of the detection is reduced so that an accurate detection can not be expected. Furthermore, to ensure high performance, the oscillator 3 must be highly accurate of low frequency. If oscillator 3 produces a high frequency level, there similarly appears a degradation of detection precision, so that a satisfactory detection cannot be expected either.

As discussed above, these two known types of groove-end detecting devices have been either expensive or low in precision of detection.

SUMMARY OF THE INVENTION

It is, therefore, a primary object of the present invention to provide a groove-end detecting apparatus for a record disk, which is simple in structure.

Another object of the present invention is to provide a groove-end detecting apparatus of the type described above, which is highly accurate even with an ordinary oscillator, without requiring the employment of a high-precision, extremely low-frequency oscillator.

Still another object of the present invention is to provide a groove-end detecting apparatus of the type described above, which performs with a high precision.

Yet another object of the present invention is to provide a groove-end detecting apparatus of the type described above, which is arranged so that there is generated a pulse having a period inverse of the travel speed of the pickup arm. This pulse is provided as a set pulse of a counter for counting clock pulses. When the period lies within the time required for the counting of a predetermined number of pulses, a groove-end detecting signal is generated.

BRIEF DESCRIPTION OF THE DRAWINGS

FIGS. 4A to 4I are time charts of signal, in which:

FIG. 4A shows a clock pulse,

FIG. 4B shows a detection output of a pickup arm traveling detection section 12, FIG. 4C shows an output of a delay flip-flop 26, FIG. 4D shows an output of an inverter 14, FIG. 4E shows an output of a one-pulse generating circuit 15, FIG. 4F shows an output of the count of a down counter, FIG. 4G shows an output of a counter circuit 31, FIG. 4H shows an output of an inverter 33, and FIG. 4I shows an output of an AND gate 32.

FIGS. 5A to 5E are signal time charts of a pulse generating circuit, in which:

FIG. 5A shows a clock pulse,

FIG. 5B shows an output of an inverter 14,

FIG. 5C shows an output of a delay flip-flop 28,

FIG. 5D shows an output of an inverter 29, and

FIG. 5E shows an output of an AND gate 30.

DETAILED DESCRIPTION OF THE PREFERRED EMBODIMENTS

Description will hereunder be made of some embodiments of the present invention by referring to the accompanying drawings.

Figure 2:
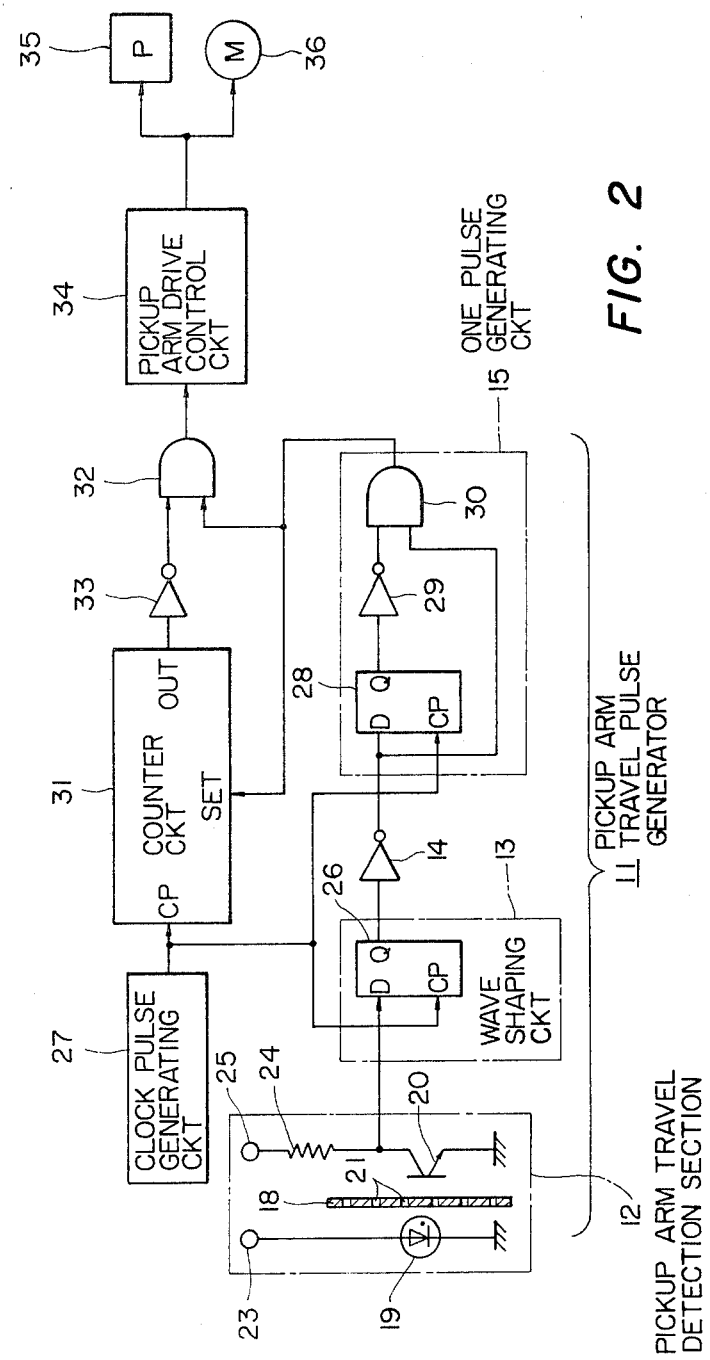
FIG. 2 is a block diagram showing the arrangement of an embodiment of the groove-end detecting apparatus of the present invention.

FIG. 2 is a block diagram showing the arrangement of the record groove-end detecting apparatus according to the present invention. In FIG. 2, reference numeral 11 represents a pickup arm travel pulse generator for generating a pulse having a period which is inversely proportional to the rotation speed of a pickup arm, i.e. the period is short when the rotation speed of the pickup arm is high, whereas it is long, conversely, when this speed is low. This pickup arm travel pulse generator 11 is comprised of a pickup arm travel detection section 12, a wave shaping circuit 13, an inverter 14, and a one-pulse generating circuit 15.

Figure 1:
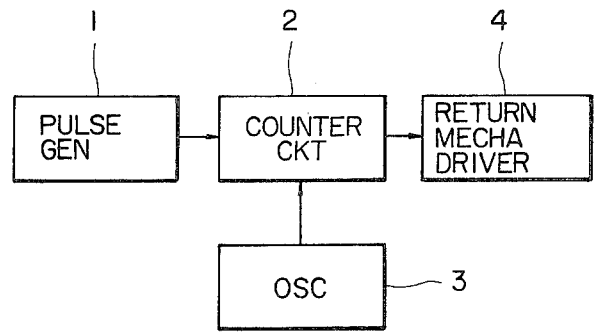
FIG. 1 is a block diagram showing a prior art groove-end detecting apparatus.
Figure 3:
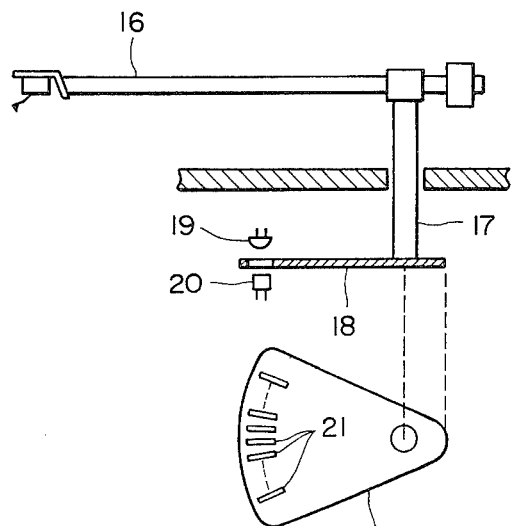
FIG. 3 is a diagrammatic explanatory illustration, showing a mechanical arrangement of the circuit for detecting the travel of the pickup arm in the apparatus arrangement of FIG. 2.

The pickup arm travel detection section 12 is secured to a horizontal rotary shaft 17 of a pickup arm 16 as shown in FIG. 3. This pickup arm travel detection section 12 is comprised of a shutter plate 18 which is rotatable interlockingly with a rotation of the pickup arm, a light-emitting diode (hereinafter to be referred to as LED) 19, and a photo-transistor 20. The shutter plate 18 is provided with a plurality of slits 21, 21, . . . which are formed at a constant angular interval at a constant distance from the center of horizontal rotation of the shaft 17. Said LED 19 and said photo-transistor 20 are arranged so as to sandwich these slits 21, 21, . . . therebetween. A cathode of the LED 19 is grounded as shown in FIG. 2, and an anode thereof is connected to a positive power supply terminal 23. Also, an emitter of the photo-transistor 20 is grounded, and a collector thereof is connected to a positive power supply terminal 25 via a resistor 24.

Figure 4:
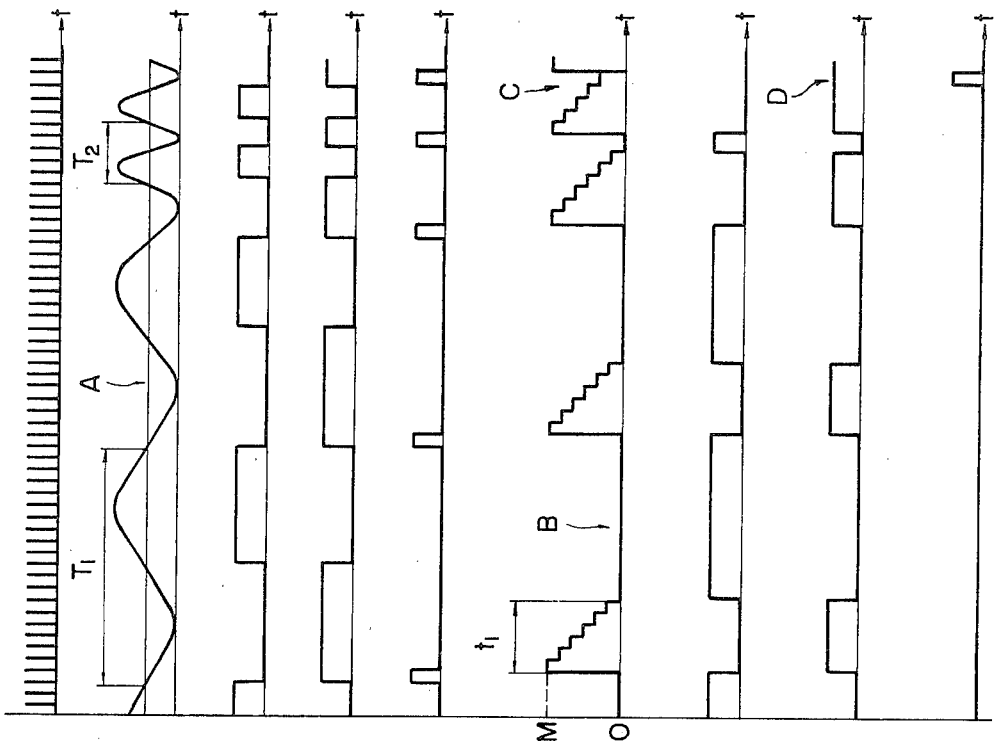

In the detection section 12 having the abovesaid arrangement, the shutter plate 18 is rotated simultaneously with a horizontal rotation of the pickup arm 16. During the horizontal rotation of the shutter plate 18, the slits 21, 21, . . . formed therethrough allow the light from the LED 19 to pass therethrough toward the phototransistor 20. On the other hand, those portions of the shutter plate 18 where no slit 21 is formed, i.e. those portions of the shutter plate defined between the slits 21, 21, . . . , obstruct the passage of the light of the LED 19 through this shutter plate. Thus, there is derived, at the collector of the photo-transistor 20, a detection output signal (analog signal) as shown in FIG. 4B having a frequency corresponding to the rotation speed of the pickup arm 16. This detection output signal is supplied to a signal input terminal D of a delay flip-flop (hereinafter to be referred to as D-FF) 26 which constitutes the wave shaping circuit 13.

This D-FF 26 is arranged so that a clock pulse (see FIG. 4A) delivered from a clock pulse generating circuit 27 is supplied to its clock terminal CP. A Q-output signal of D-FF 26 is inverted by the inverter 14 and is supplied to a signal input terminal D of a D-FF 28 of the one-pulse generating circuit 15. Said D-FF 26 is designed to be operative so that, in case the signal applied to the signal input terminal D is greater than a threshold level, the Q output signal is rendered to "1" signal (this means a "1" signal of binary level, and this will apply to the subsequent statement) in synchronism with the clock pulse supplied to the clock terminal CP. Also, in case the signal applied to the signal input terminal D is smaller than the threshold level, the Q output signal is rendered to "0" signal (this means a "0" signal of binary level and this will apply to the subsequent statement) in synchronism with the clock pulse applied to the clock terminal CP. For example, in case the signal shown in FIG. 4B is applied to the signal input terminal D, and assuming that the threshold level is such one as shown by symbol A shown in the drawing, then the Q output signal will become as shown in FIG. 4C. And, when the signal shown in FIG. 4C is inverted by the inverter 14, the signal becomes as shown in FIG. 4D.

Figure 5:
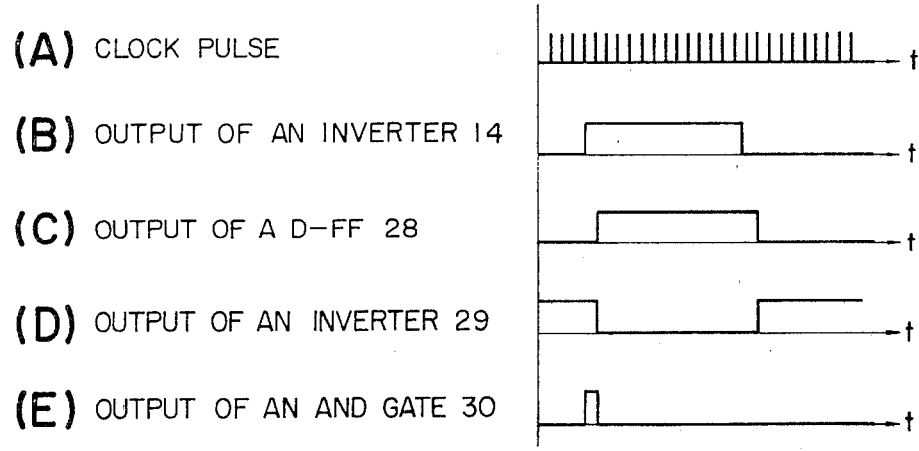

The one-pulse generating circuit 15 is comprised of the D-FF 28, an inverter 29 and an AND gate 30. This is a circuit for generating, at the leading edge of an output signal (see FIG. 4D) of the inverter 14, a pulse having a pulse width equal to the cycle of the clock pulse. That is, by assuming that the output signal of the inverter 14 is as shown in FIG. 5B, the output signal of D-FF 28 will become as shown in FIG. 5C. Also, the output signal of the inverter 29 will become as shown in FIG. 5D. Accordingly, at the time an AND condition between the output signal of the inverter 14 shown in FIG. 5B and the output signal of the inverter 29 is established in the AND gate 30, there is derived, at the leading edge of the output signal of the inverter 14, a pulse having a pulse width equal to the cycle of the clock pulse (FIG. 5A), as shown in FIG. 5E. The pulse which has been obtained in the manner stated above is supplied to a set input terminal SET of a counter circuit 31 and to one of the input terminals of an AND gate serving as a groove-end detection signal generating circuit.

The clock pulse generating circuit 27 is a circuit for generating a high-frequency clock pulse of a constant period as shown in FIG. 5A. The clock pulse which is generated is supplied to the D-FF 26 and D-FF 28 and to a clock terminal CP of the counter circuit 31. This counter circuit 31 is comprised of a down-counter. In case a pulse generated by the one-pulse generating circuit 15 is applied to the set input terminal SET, this pulse is set to a predetermined numerical value M, and it is subjected to down-counting by the clock pulse which is applied to the clock terminal CP. The count which is an output of this down-counter progressively decreases from the abovesaid predetermined numerical value M, and after it has decreased to zero ("0"), the output of this down counter continues the "0" state. Also, the signal which is derived at an output terminal OUT of the counter circuit 31 becomes "1" signal when the count output of the down-counter is "0", and at other instance than "0", this count output becomes "0".

This output signal of the counter circuit 31 is inverted by an inverter 33 (see FIG. 4H), and it is supplied to the other input terminal of the AND gate 32. This AND gate is operative so that it allows the output of "1" signal from the one-pulse generating circuit 15 to pass when the output signal of said inverter 33 is "1" signal, and provides a pickup arm drive control circuit 34 as a pickup arm return signal as shown in FIG. 4I. This pick-up arm drive control circuit 34, upon its receipt of the pickup arm return signal, drives a plunger 35 of a pick-up arm lifter, to uplift the pickup arm 16, and along therewith, it drives a pickup arm drive motor 36 to return the pickup arm 16 to its pickup arm rest position.

Next, description will hereunder be made of the operation of the record groove-end detecting apparatus having the aforesaid arrangement. In the state that a reproduction stylus of the pickup cartridge which is provided at the foremost end of the pickup arm is tracing the signal-carrying groove of a record disk, the feed pitch of this signal-carrying groove is smaller than the feed pitch of the lead-out groove of this record disk. Therefore, the horizontal rotation speed of the pickup arm 16 is small. Accordingly, the shutter plate 18 is rotated gently, so that the detection output of the detection section 12 will become a signal having a relatively long cycle $T_1$ as shown in FIG. 4B. As a result, all of the output signal of the D-FF 26, the output signal of the inverter 14 and the output signal of the one-pulse generating circuit 15 are rendered to a signal having a relatively long period $T_1$.

On the other hand, in case the reproduction stylus traces the lead-out groove of the record disk, the feed pitch of the lead-out groove is greater than the feed pitch of the signal-carrying groove. Accordingly, the speed of horizontal rotation of the pickup arm 16 is great, so that the shutter plate 18 rotates with a relatively high speed. Thus, the detection output of the detection section 12 becomes a signal having a short period $T_2$ as shown in FIG. 4B. As a result, the output signal of the D-FF 26, the output signal of the inverter 14 and the output signal of the one-pulse generating circuit 15 become signals having a short cycle $T_1$ as shown in FIGS. 4C, 4D and 4E.

The value M which is set by the pulse applied to the set input terminal SET of the down-counter of the counter circuit 31 is so set that the time which is {M×(period of clock pulse)}, which, for example, is a time $t_1$ in FIG. 4F, is smaller than the period $T_1$ and also greater than the cycle $T_2$. As such, the output of the down-counter has a region B of "0" signal where the cycle of the detection output of the detection section 12 is $T_1$ as shown in FIG. 4F. However, in case the cycle of the detection output is $T_2$, the pulse shown in FIG. 4E is applied to the set input terminal SET before the count output becomes "0" (see the portion of symbol C in FIG. 4F). That is, the value M is set so that the output signal of the counter circuit 31 and the output signal of the inverter 33 become as shown in FIG. 4H and FIG. 4I, respectively.

Accordingly, in case that the stylus traces the signal-carrying groove and the output signal of the counter circuit 31 has a region B of "0" signal as shown in FIG. 4F, the output signal of the inverter 33 is "0" signal when the output signal of the one-pulse generating circuit 15 is outputted. Thus, the pickup arm return signal form the AND gate 32 is not able to be derived.

On the other hand, in case that the stylus traces the lead-out groove and the output signal of the counter circuit 31 does not have a region B of "0" signal as shown in FIG. 4F, the output signal of the inverter 33 becomes "1" at the time the output signal of the one-pulse generating circuit 15 is outputted (see the portion of symbol D in FIG. 4H). Therefore, the pickup arm return signal from the AND gate 32 is derived and inputted to the pickup arm drive control circuit 34 so as to return the pickup arm 16 to the pickup arm rest position.

In the embodiment stated above, the counter circuit 31 includes a down-counter. By arranging this counter circuit 31 so as to have an up-counter, there can be obtained an identical function and performance. In such instance, however, care has to be taken to provide an arrangement described below. When a pulse is applied to the set input terminal SET, the up-counter is set to "0", i.e. the up-counter is cleared. Also, when the count output of the up-counter has reached a predetermined numerical value M, arrangement will have to be provided so that the counter output continues to provide this value M until subsequently a pulse is applied to the set input terminal SET. Furthermore, when the count output has this value M, arrangement has to be provided so that the output signal of the counter circuit 31 will become a "1" signal, whereas when the count output is something other than the numerical value M, the output signal of the counter circuit 31 will become a "0" signal.

Figure 6:
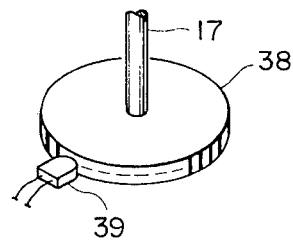
FIG. 6 is a perspective explanatory illustration showing a mechanical arrangement, as another embodiment, of a magnetic pickup arm travel detecting means.
Figure 7:
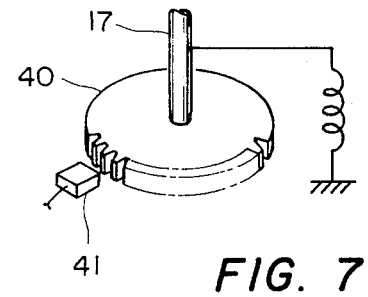
FIG. 7 is a perspective explanatory illustration showing a mechanical arrangement of the pickup arm travel detecting means utilizing the variation of capacitance, of still another embodiment.

Description has been made of an embodiment wherein the detection section 12 has the arrangement shown in FIG. 2 and in FIG. 3. Such arrangement, however, may be replaced by another arrangement that, as shown in FIG. 6, the horizontal rotary shaft 17 of the pickup arm 16 is provided with a magnetic disk 38, and that magnetic signals are recorded at an equal pitch around the circumference of this magnetic disk 38 to be detected by a magnetic head 39. Or, alternatively, a rotary electrode 40 is provided on the horizontal rotary shaft 17 and teeth are formed at an equal pitch on the circumference of this rotary electrode. And, a fixed electrode 41 is provided to face this circumference of the teeth section, so that the variation of the static capacitance between the rotary electrode 40 and fixed electrode 41 is detected.

What is claimed is:

1. A device for detecting a signal groove-end of a record or video disk for use in a phonographic or video signal reproducing apparatus, comprising:

a pickup arm;

means for generating a clock pulse of a certain frequency;

means for generating pickup arm travel pulses of a period inversely proportional to a travel speed of the pickup arm;

means for: (1) counting, to a first predetermined value, pulses delivered from said clock pulse generating means, and (2) generating a count signal until said counting means has reached said first predetermined value, said counting means being set to a second predetermined value in response to said pickup arm travel pulses;

means, responsive to said pickup arm travel pulses and said count signal for generating a groove-end detection signal when one of said pickup arm travel pulses is generated during the occurrence of said count signal;

means responsive to said groove-end detection signal and generating a control signal for controlling the travel of said pickup arm; and means responsive to said control signal for driving said pickup arm.

2. A device according to claim 1, in which said means for generating a pickup arm travel pulse comprises: means for detecting a travel of the pickup arm and for generating a signal which varies at a speed corresponding to a travel speed of the pickup arm; and means for generating a pulse for each period of the variation of the signal delivered from said pickup arm travel detecting means.

3. A device according to claim 2, in which said pickup arm travel detecting means is comprised of a photo-electric transducing means for generating a signal corresponding to the travel speed of the pickup arm without contacting the pickup arm.

4. A device according to claim 3, in which said photo-electric transducing means comprises: a light-emitting element, a light-receiving element, and a light-shuttering member movable interlockingly with a travel of said pickup arm and having a plurality of slits formed therethrough at intervals of a predetermined constant pitch and being sandwiched between said light-emitting element and said light-receiving element positioned so as to allow a light from said light-emitting element to pass through said slits and intermittently impinge onto said light-receiving element in accordance with a travel of said pickup arm for generation of an output signal by said light-receiving element.

5. A device according to claim 4, in which said light-emitting element is a light-emitting diode.

6. A device according to claim 4, in which said light-receiving element is a photo-transistor.

7. A device according to claim 2, in which said pickup arm travel detecting means is comprised of magneto-electric converting system for generating a signal corresponding to a travel speed of the pickup arm.

8. A device according to claim 7, in which said magneto-electric converting system comprises: a magnetic disk movable interlockingly with a travel of said pickup arm and having magnetic signals recorded on its circumference at an equal pitch; and a magnetic head for detecting said magnetic signals recorded on the circumference of the magnetic disk to generate an output signal.

9. A device according to claim 2, in which said pickup arm travel detecting means comprises: a rotatable electrode movable interlockingly with a travel of said pickup arm and having teeth formed at a predetermined pitch on its circumference; and a stationary electrode facing said rotatable electrode not contacting therewith, to deliver an output signal produced by variation in capacitance between said rotatable electrode and said stationary electrode in accordance with a travel of the pickup arm.

10. A device according to claim 2, in which said means for generating a pulse comprises: a wave shaping means for converting, into a binary level signal, an output signal delivered form said pickup arm travel detecting means; a delay means for delaying, by a period of said clock pulse, an output of said wave shaping means; and a gating means for generating a pulse signal having the period of said clock pulse when an AND condition between an output signal from said wave shaping means and an output signal from said delay means is established.

11. A device according to claim 10, in which said wave shaping means comprises a delay flip-flop circuit adapted to receive, at its D terminal, an output signal from said pickup arm travel detecting means, and to receive said clock pulse at its clock terminal.

12. A device according to claim 10, in which said delay means comprises a delay flip-flop circuit adapted to receive, at its D terminal, an output signal from said wave shaping means, and to receive said clock pulse at its clock terminal.

13. A device according to claim 1, in which said counting means includes means for generating one binary level signal prior to counting-over said first predetermined value, said one binary level signal being said count signal, and the other binary level signal when counting over said value.

14. A device according to claim 13, in which said first predetermined value represents counts required for counting said clock pulse during a predetermined time which is shorter than a maximum period of a pulse from said pickup arm travel pulse generating means and longer than its minimum period.

15. A device according to claim 13, in which said counting means includes a down-counter for down-counting said clock pulse from a predetermined numerical value set by a pulse delivered from said pickup arm travel pulse generating means.

16. A device according to claim 13, in which said counting means includes an up-counter reset by response to said pickup arm travel pulses and to up-count said clock pulse up to said first predetermined value.

17. A device according to claim 1, in which said means for generating a groove-end detection signal is comprised of an AND gate for receiving, at one of its input terminals, an output signal delivered from said counting means and for receiving, at the other of said input terminals, said pickup arm travel pulses and for generating a groove-end detection signal upon receipt of one of said pickup arm travel pulses before counting-over of said first predetermined value by said counting means.

* * * * *